(12) United States Patent
Alajajyan

(10) Patent No.: US 9,307,749 B1
(45) Date of Patent: Apr. 12, 2016

(54) FISHING REEL SPEED CONTROL

(71) Applicant: Harout Alajajyan, Chatsworth, CA (US)

(72) Inventor: Harout Alajajyan, Chatsworth, CA (US)

(*) Notice: Subject to any disclaimer, the term of this patent is extended or adjusted under 35 U.S.C. 154(b) by 208 days.

(21) Appl. No.: 13/986,398

(22) Filed: Apr. 29, 2013

Related U.S. Application Data

(60) Provisional application No. 61/688,469, filed on May 16, 2012.

(51) Int. Cl.
*A01K 89/01* (2006.01)

(52) U.S. Cl.
CPC .................................. *A01K 89/0105* (2013.01)

(58) Field of Classification Search
USPC .......................................... 242/255, 259, 263
See application file for complete search history.

(56) References Cited

U.S. PATENT DOCUMENTS

| | | | | |
|---|---|---|---|---|
| 3,325,117 A * | 6/1967 | Hiromitsu | ...................... | 242/255 |
| 4,867,392 A * | 9/1989 | Sato | ............................... | 242/255 |
| 5,178,343 A * | 1/1993 | Sato | ............................... | 242/255 |
| 5,297,756 A * | 3/1994 | Ikuta | .............................. | 242/270 |
| 6,325,315 B1 * | 12/2001 | Chang | .......................... | 242/255 |
| 6,830,208 B2 * | 12/2004 | Datcuk, Jr. | ..................... | 242/255 |
| 7,278,599 B2 * | 10/2007 | Alajajyan et al. | .............. | 242/303 |
| 7,429,011 B1 * | 9/2008 | Chang | .......................... | 242/260 |
| 7,922,113 B1 | 4/2011 | Alajajyan | | |
| 8,066,216 B2 * | 11/2011 | Takechi | ........................ | 242/246 |
| 8,113,456 B2 * | 2/2012 | Takechi et al. | ................. | 242/257 |
| 8,534,584 B2 * | 9/2013 | Hirayama | ..................... | 242/259 |

* cited by examiner

*Primary Examiner* — Emmanuel M Marcelo
(74) *Attorney, Agent, or Firm* — William W. Haefliger

(57) ABSTRACT

In a reel and fishing line control, the combination with a fishing reel apparatus comprising, a rotary handle and a control shaft, three reel driving spur gears having different diameters, axially shiftable mechanism for selectively coupling the control shaft to the individual gears, and mechanism including a coupling selector proximate the reel apparatus.

16 Claims, 7 Drawing Sheets

Figure 1:
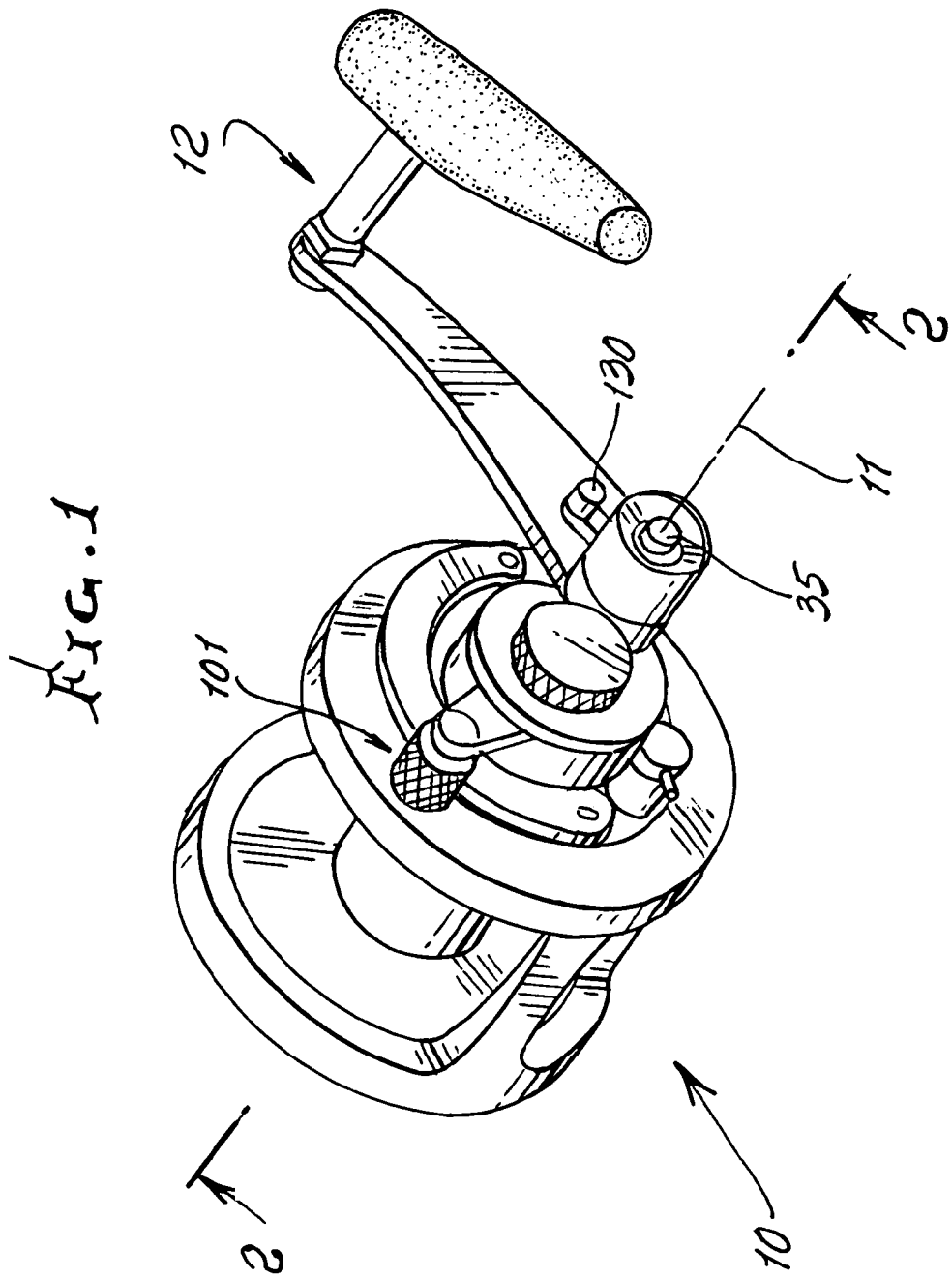

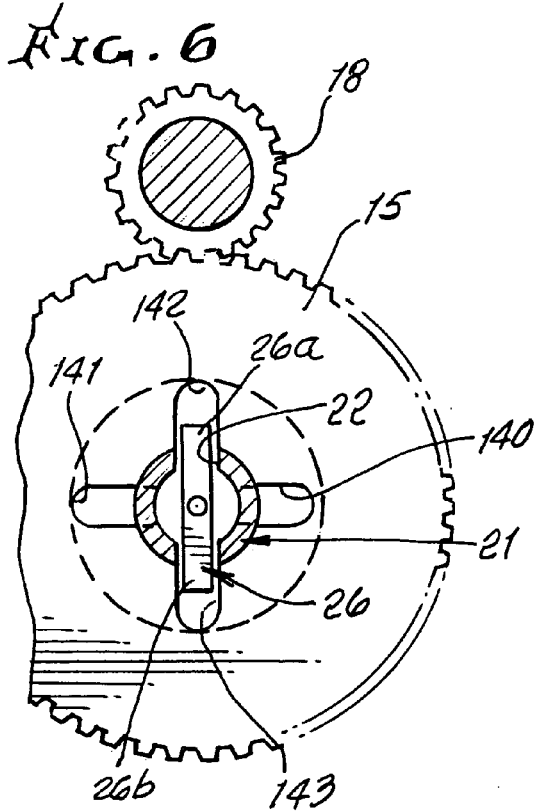
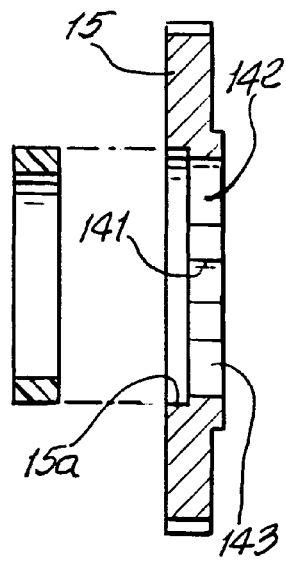
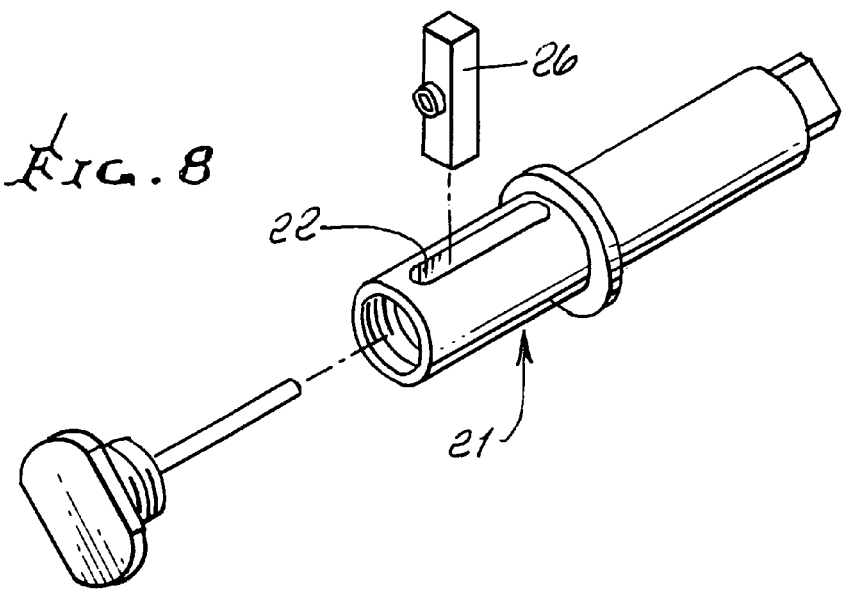

FISHING REEL SPEED CONTROL

This application claims priority from provisional application Ser. No. 61/688,469, filed May 16, 2012.

BACKGROUND OF THE INVENTION

This invention relates generally to control of fishing reel winding of fishing lines, and more particularly concerns improvements in construction, operation and efficiency of multiple speeds winding of such reels, as well as rapid, accurate changing of reel winding speeds, during fishing.

There is need for reel apparatus incorporating the above needs, advantages and efficiencies, as well as for improvements in reliability, compactness and control of such apparatus.

SUMMARY OF THE INVENTION

It is a major object of the invention to provide improved apparatus meeting the above needs.

Basically, the reeled fishing line control means comprises
a) a rotary handle and a control shaft,
b) three reel driving spur gears having different diameters,
c) axially shiftable mechanism for selectively coupling the control shaft to the individual gears, and mechanism including a coupling selector proximate the reel apparatus.

Another object is and provide such mechanism to include a manually operable coupler controllable proximate the handle, and axially shiftable to selectively couple the control shaft to the individual gears. As will be seen, registering slots are provided in the shaft and driving gears, and a dog is positioned to extend radially through the slots to couple to the driving gears, selectively.

A further object is to provide such mechanism to include a spring urged pusher that extends protectively lengthwise within the shaft, the pusher having axial positioning corresponding to the selected gear position. That spring means urges the pusher axially, to assist such coupling. Means including a push back spring selectively holds the dog in each of three selected axial positions.

An additional object includes provision of a sensor that senses and confirms axial shifting of the coupler to a position corresponding to coupling to a selected gear.

Yet another object includes provision of three driven gears on the reel shaft for selectively meshing with the spur gears that rotatably drive the reel in response to reel handle rotation.

An added important object is to provide a pusher to have multiple axial positions, in each of which a dog positioning spring located within the control shaft cooperates with the pusher to position the dog for coupling to a selected driving gear. A return positioning spring extends about the pusher to urge it and the dog positioning spring bodily in a rightward return direction.

Other objects include provision of means for controllably braking the said reel, said means including a braking control handle proximate the coupling selector; provision of a braking control handle defining a first axis of rotation, and wherein the coupling selector includes a second axis of selector lengthwise displacement; and provision of a lock arm proximate the coupling selector and pivotable in position for locking said coupling selector in at least two positions of displacement along the second axis.

These and other objects and advantages of the invention, as well as the details of an illustrative embodiment, will be more fully understood from the following specification and drawings, in which:

DRAWING DESCRIPTION

Figure 2:
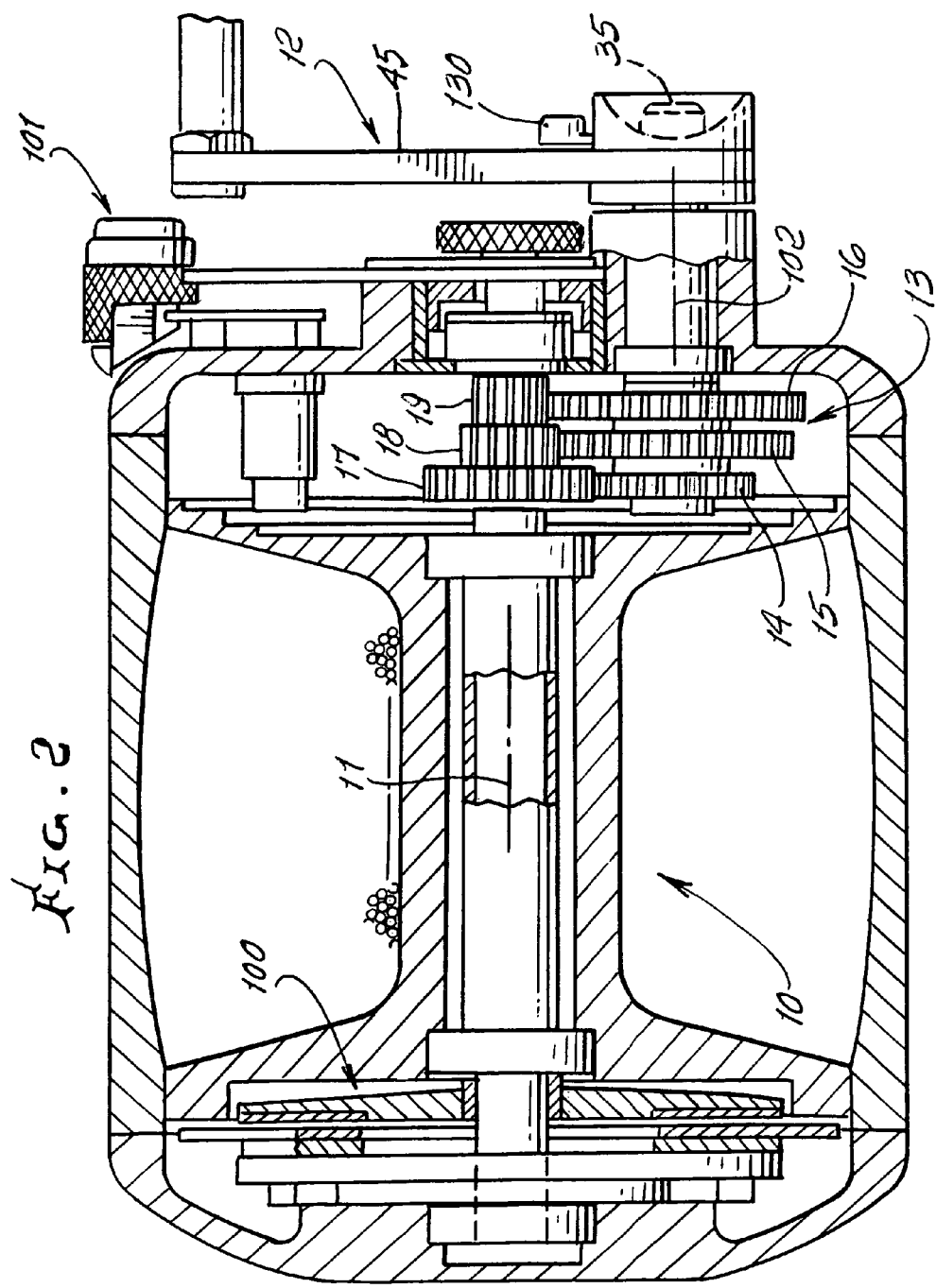
Figure 3:
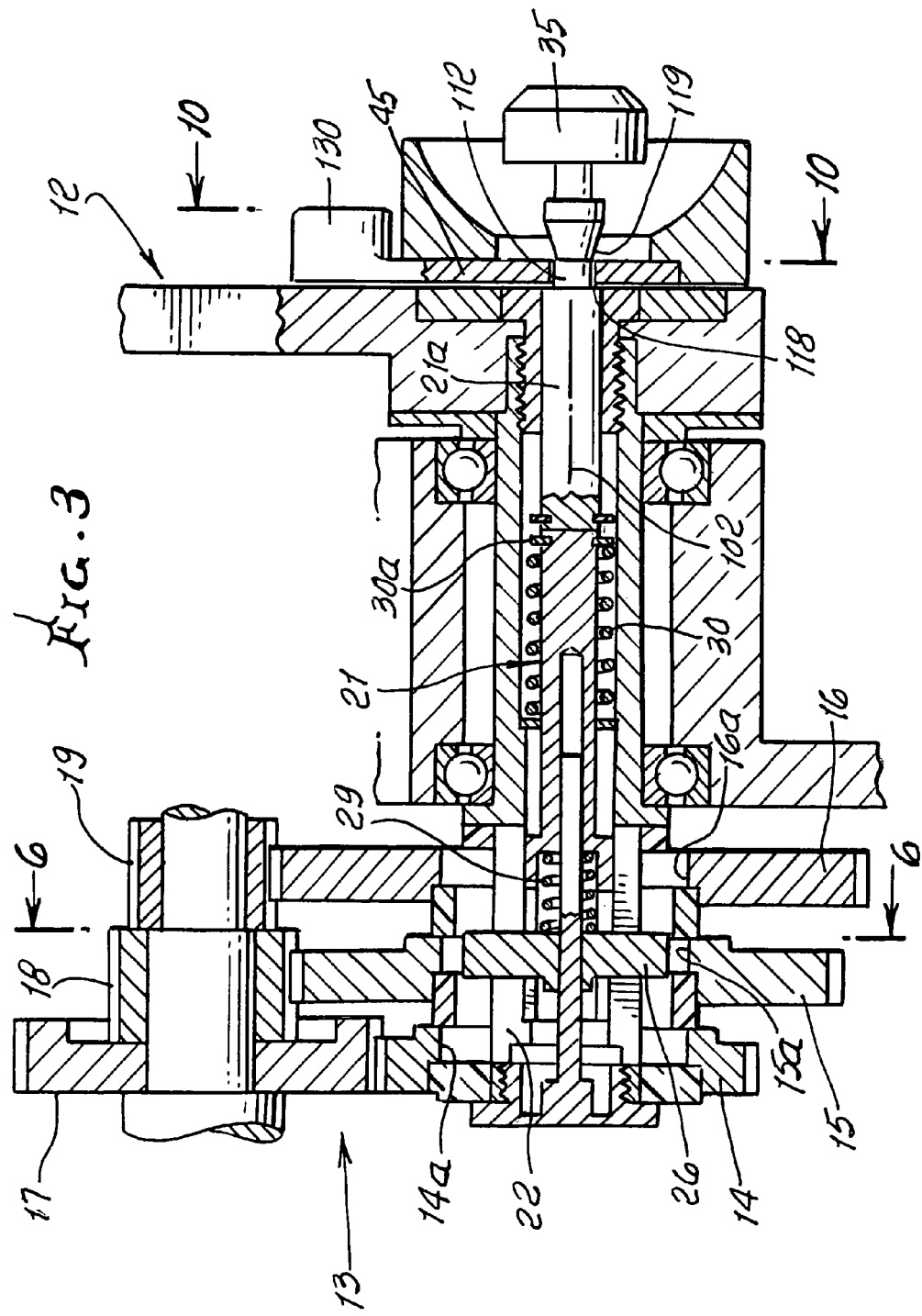
Figure 4:
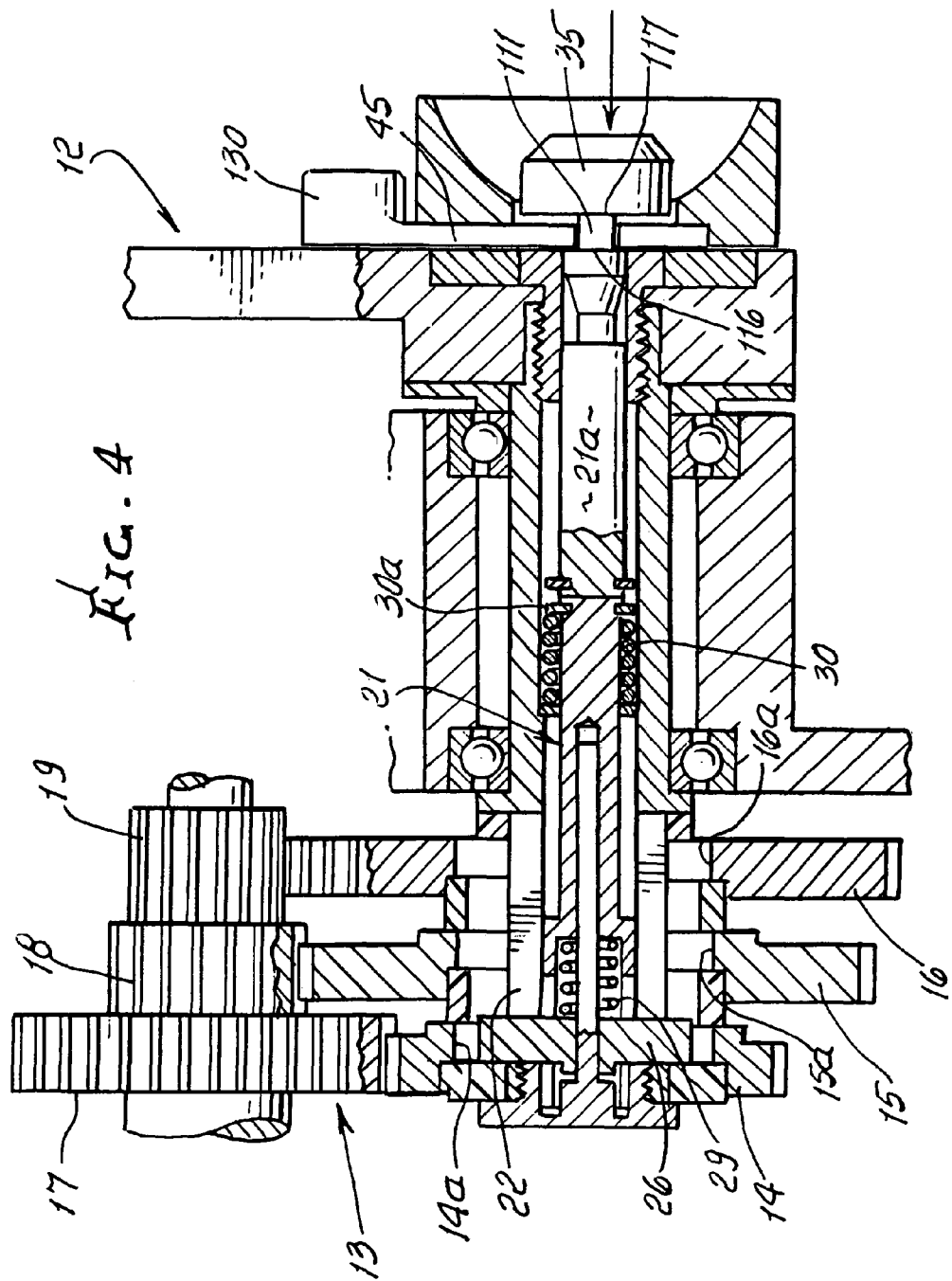
Figure 5:
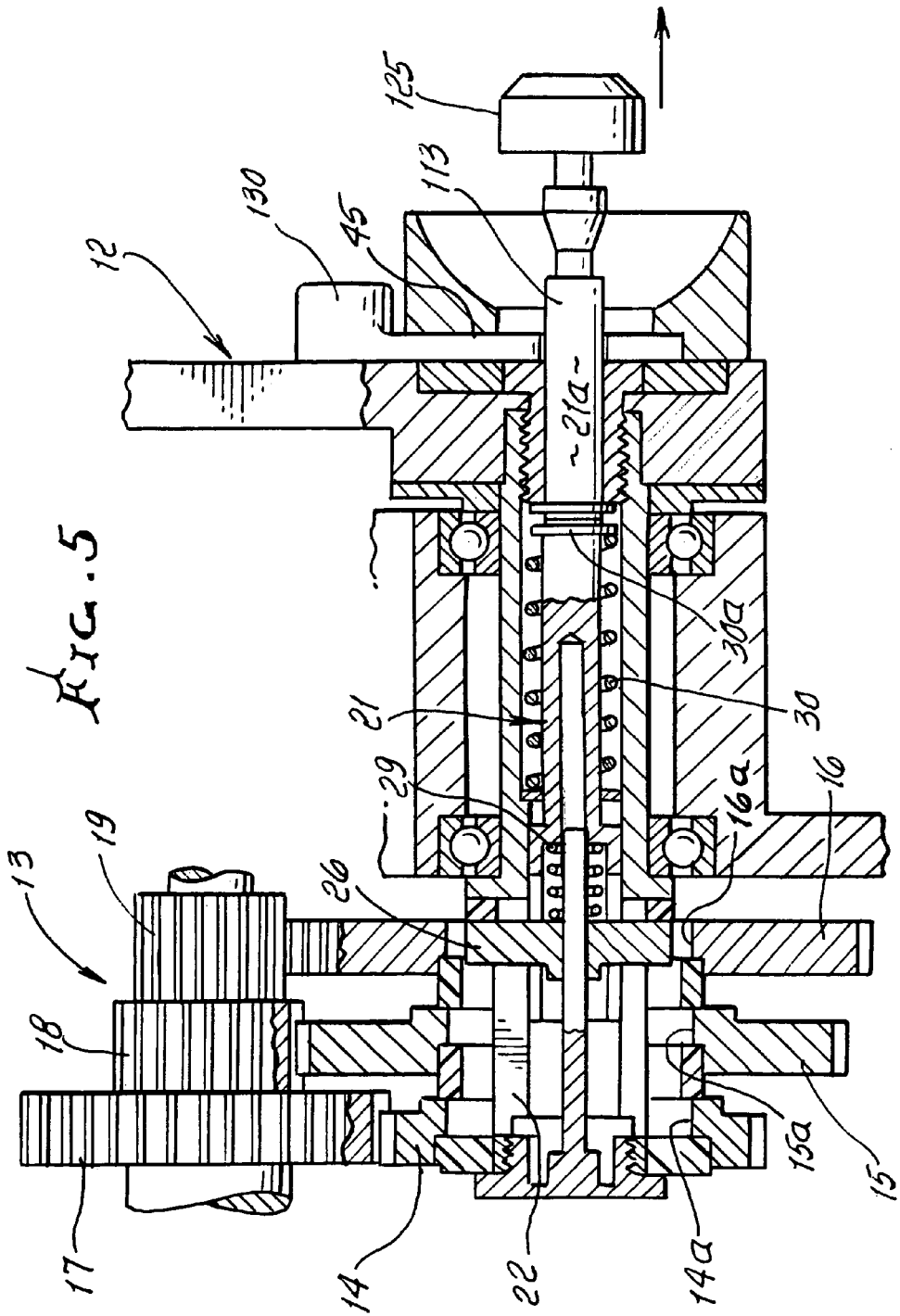
Figure 9:
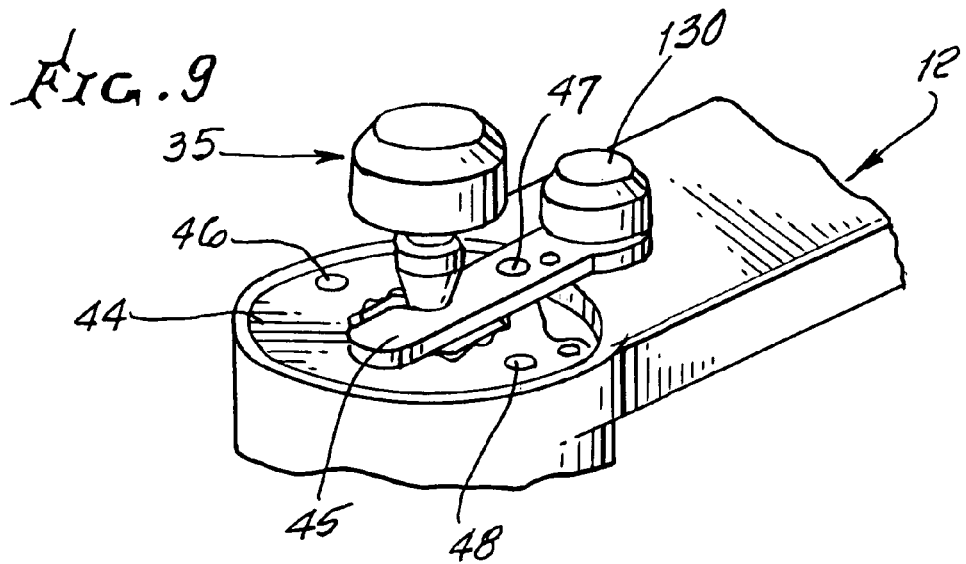
Figure 10:
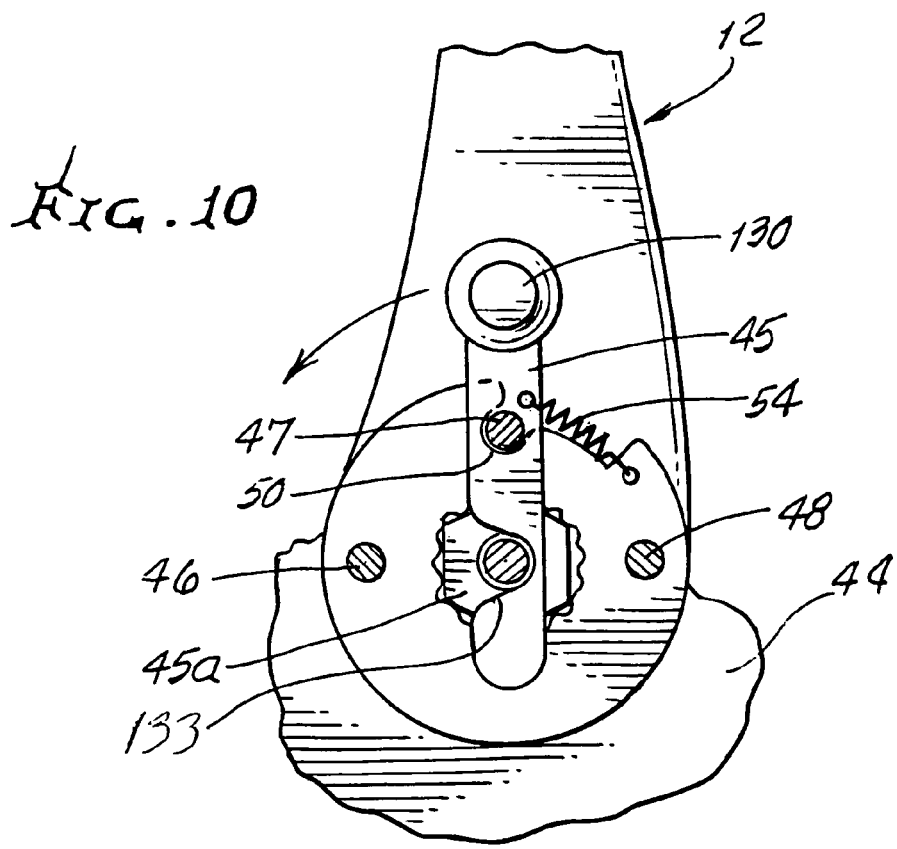

FIG. 1 is a perspective view of reel apparatus incorporating the invention;
FIG. 2 is an enlarged section taken in elevation on lines 2-2 of FIG. 1;
FIG. 3 is a yet further enlarged axial section showing elements of the control mechanism;
FIG. 4 is a view like FIG. 3, but showing axially shifted positions of elements;
FIG. 5 is a view like FIG. 4 showing an alternate position of the control elements;
FIG. 6 is an enlarged section taken on lines 6-6 of FIG. 3;
FIG. 7 is a side elevation view of the FIG. 6 gearing;
FIG. 8 is a perspective view of slots and dog elements;
FIG. 9 is a perspective view of selector mechanism; and
FIG. 10 is an elevation showing control elements.

DETAILED DESCRIPTION

In the drawings, a fishing reel 10 is rotated about axis 11 in response to turning of handle 12. Gearing 13 is provided to transmit drive to the reel. As shown, three reel driving spur gears 14, 15 and 16 are provided, and have different diameters, whereby the user can select which one of the three spur gears 14-16 is actively coupled to the reel; and the invention includes axially shiftable mechanism, better seen in FIGS. 3, 4 and 5, to accomplish desired coupling of a selected one of the gears 14-16, to driven gears 17-19, whereby the user can select which one of three different reel winding speeds is required, as during fishing. For example, if spur drive gear 14 is selectively actively coupled to driven spur gear 17, the reel is driven at angular velocity $V_1$; and if spur drive gear 15 is actively selectively coupled to driven spur gear 18, the reel is driven at angular velocity $V_2$, where $V_2$ exceeds $V_1$; and if spur drive gear 16 is actively selectively coupled to driven spur gear 19, the reel is driven at angular velocity $V_3$, where $V_3$ exceeds $V_2$. Selection of active coupling is accomplished by coupling of a drive shaft 21 to a selected drive gear, through provision of registerable slots 22 in the drive shaft, and 14a, 15a and 16a in the drive gears 14, 15 and 16 respectively, as in FIGS. 4 and 6-8.

FIGS. 3-5 show a radially extending coupler dog 26 carried by the drive shaft 21, and extending through the axially extending slots 22 in the drive shaft, to couple to a selected drive gear depending upon the selected axial position of the dog. That positioning is determined by an internal dog positioning spring 29 that endwise cooperates with shaft 21, acting as a pusher, to axially position or push the dog for coupling to a selected driving gear. Spring 29 urges the dog to the left in FIGS. 3-5, whereas a positioning spring 30 urges the pusher in a return, rightward direction, as via annular 30a.

A handle 35 protruding from the end of the axial pusher extension 21a is manually controllable to displace the pusher leftwardly, for example, between three axial positions so that the radially extending end portions of the dog engage in radial opposed slots in a selected drive gear, to drive the selected driven spur gear, as referred to. The dog positioning spring 29 has lost motion connection to the drive shaft by virtue of the axial slots 22 in that shaft, as seen in FIG. 6-8.

FIGS. 9 and 10 show detent structure 40 associated with selector handle 35 adjacent structure 44, the lock arm 45 is pivoted at 47. Note the three lock arm locking positions corresponding to projection 46-48 on 44. When the lock arm is pivoted out of such positions, the pusher can be pushed and axially displaced, to position the dog in a selected axial position to couple to one of the drive gears. A cut-out 50 in the structure 44 receives a projection 46-48, and a return spring 54 is provided. Note lock arm nut 45*a*. The lock arm locks the pusher in each of three selected axial positions. Accordingly, the described structure provides a sensor or sensing means that senses and confirms axial shifting of the coupler to a position corresponding to coupling to a selected gear.

Referring back to FIGS. 2 and 3, additional reel structure includes means 100 for controllably braking the reel, including a braking control handle 101 located proximate the coupling selector, the braking control handle defining a first axis 11 of rotation, and the coupling selector including a second axis 102 of selected lengthwise displacement parallel to and offset from that first axis. See also that braking means disclosure in U.S. Pat. No. 7,922,113 incorporated herein by reference.

FIG. 4 shows a lock arm 45 rotated manually to embrace a first axial portion 111 of the pusher, to lock it in position for driving gear 14 via dog 26; FIG. 3 shows lock arm 45 rotated manually to embrace a second axial portion 112 of the pusher to lock it in position for driving gear 15 via dog 26; and FIG. 5 shows lock arm 45 rotated manually to embrace a third axially elongated portion 113 of the pusher, allowing portion 113 to move axially to limited extent, allowing gear 16 to be driven by the dog relative to which the pusher is axially movable. In FIG. 4, the lock arm is closely received between pusher radial surfaces 116 and 117; and FIG. 3 the lock arm is closely received between pusher surfaces 118 and 119; and in FIG. 5 the lock arm is not received between pusher axially facing surfaces. The pusher is axially movable by knob 125 when the lock arm is pivotally retracted outwardly away from the pusher. A spring 54 can be employed to rotatably urge the lock arm toward the pusher three positions, as discussed. A knob 130 on the lock arm is rotatable to urge it clockwise in FIG. 10, about an arm axis of rotation parallel to axis 11, which is parallel to the reel axis of rotation, for compactness. Also, in FIG. 10, the arm curved recessed portion 133 receives portion 112, shown in FIG. 3 to block pusher axial travel.

FIG. 6 show radial gear representative slots for dog reception; there being slots 140 and 141 at 0° and 180°, and slots 142 and 143 at 90° and 270°, enhancing captivation capability as respects the dog 26 ends 26*a* and 26*b*, and providing gear driving force balancing division.

I claim:

1. In a reel and fishing line control, the combination with a fishing reel apparatus comprising,
    a) a rotary handle and a control shaft,
    b) three reel driving spur gears having different diameters,
    c) axially shiftable mechanism for selectively coupling the control shaft to the individual gears, said mechanism including a coupling selector proximate the reel apparatus,
    d) said mechanism including a manually operable coupler controllable proximate the handle, and axially shiftable to selectively couple the control shaft to the individual gears,
    e) there being registering slots in the shaft and in the driving gears, and including a coupler dog extending generally radially through the slots to couple to the driving gears, selectively,
    f) there being a dog positioning pusher that extends protectively lengthwise within carrier structure,
    g) the dog having an axial position located between two of said three gears in which the dog is axially engaged by said pusher,
    h) including a reel shaft, and three driven gears on the reel shaft for meshing with the spur gears selectively driven by the control shaft,
    i) there being a lock arm movable to lock the pusher in each of two axial positions, corresponding to drive of two of the gears, the pusher having a third axially extended position in which it is not locked, but in which the lock arm allows axial shifting of the pusher dog engagement with the third gear for drive thereof.

2. The combination of claim 1 wherein the pusher has axial positions corresponding to the selected drive spur gear position.

3. The combination of claim 2 wherein the pusher has a manually pushable element proximate the rotary handle.

4. The combination of claim 2 including a sensor that senses and confirms axial shifting of the coupler to a position corresponding to coupling to a selected gear.

5. The combination of claim 1 including a sensor that senses and confirms axial shifting of the coupler to a position corresponding to coupling to a selected gear.

6. The combination of claim 1 including a spring urging the pusher axially, to assist said coupling.

7. The combination of claim 1 including means including a push back spring to selectively hold the dog in each of three selected axial positions.

8. The combination of claim 1 wherein the pusher has multiple axial positions, in each of which a dog positioning spring located within the control shaft cooperates with the pusher to position the dog for coupling to a selected driving gear.

9. The combination of claim 8 including a return positioning spring that extends about the pusher to urge it and the dog positioning spring bodily in a return direction.

10. The combination of claim 1 including means for controllably braking said reel, said means including a braking control handle proximate said coupling selector.

11. The combination of claim 10 wherein said braking control handle defines a first axis of rotation, and said coupling selector includes a second axis.

12. The combination of claim 11 wherein said lock arm is proximate said coupling selector and pivotable into position for locking said coupling selector in at least two positions of displacement along said second axis.

13. The combination of claim 12 wherein the pusher is blocked by the lock arm from axial travel in two axial positions of the pusher, and is free for axial travel in a third axial position of the pusher.

14. The combination of claim 12 wherein said braking control handle defines a first axis of rotation.

15. The combination of claim 1 including a push back spring selectively holding the dog in each of three selected axial positions.

16. The combination of claim 1 including registering slots in the shaft and in the driving gears, said dog positioning pusher extending protectively lengthwise within a carrier structure, and wherein the pusher has multiple axial positions, in each of which a dog positioning spring located within the control shaft cooperates with the pusher to position the dog for coupling to a selected driving gear.

* * * * *